US006342997B1

(12) United States Patent
Khadkikar et al.

(10) Patent No.: US 6,342,997 B1
(45) Date of Patent: Jan. 29, 2002

(54) HIGH SENSITIVITY DIODE TEMPERATURE SENSOR WITH ADJUSTABLE CURRENT SOURCE

(75) Inventors: Prasad S. Khadkikar, Seville; James A. Tennant, Perrysville; Bernd D. Zimmerman, Ashland; David W. Reynolds, Galion, all of OH (US); Thomas C. Anderson, Arlington Heights, IL (US)

(73) Assignee: Therm-O-Disc, Incorporated, Mansfield, OH (US)

( * ) Notice: Subject to any disclaimer, the term of this patent is extended or adjusted under 35 U.S.C. 154(b) by 0 days.

(21) Appl. No.: 09/558,918

(22) Filed: Apr. 26, 2000

Related U.S. Application Data

(63) Continuation-in-part of application No. 09/370,804, filed on Aug. 9, 1999, now abandoned, which is a continuation of application No. 09/023,013, filed on Feb. 11, 1998, now Pat. No. 5,955,793.

(51) Int. Cl.[7] .................................................. H02H 5/04
(52) U.S. Cl. ....................... 361/103; 361/100; 361/93.8
(58) Field of Search ................................ 361/103, 106, 361/100, 93.8; 307/116, 117, 127, 126; 219/502, 482, 494, 490; 257/467, 414

(56) References Cited

U.S. PATENT DOCUMENTS

| | | | | |
|---|---|---|---|---|
| 3,420,104 A | | 1/1969 | Troemel et al. | |
| 3,719,797 A | | 3/1973 | Andrews, Jr. et al. | |
| 3,722,283 A | | 3/1973 | Treharne et al. | |
| 3,780,322 A | | 12/1973 | Walters | |
| 3,791,217 A | | 2/1974 | Stout et al. | |
| 3,962,692 A | | 6/1976 | Murphy et al. | |
| 3,987,310 A | | 10/1976 | Peltier et al. | |
| 4,278,970 A | | 7/1981 | Streczyn et al. | |
| 4,316,202 A | | 2/1982 | Mori | |
| 4,441,071 A | * | 4/1984 | Houseman | 323/365 |
| 4,636,092 A | | 1/1987 | Hegyi | |
| 4,667,265 A | | 5/1987 | Stanojevic et al. | |
| 4,727,269 A | | 2/1988 | Luich | |
| 4,730,228 A | * | 3/1988 | Einzinger et al. | 374/17 |
| 4,924,212 A | * | 5/1990 | Fruhauf et al. | 340/598 |
| 4,943,740 A | | 7/1990 | Gulczynski | |
| 4,977,476 A | | 12/1990 | Marshall et al. | |
| 5,024,535 A | | 6/1991 | Winston, Jr. | |
| 5,070,322 A | | 12/1991 | Fujihira | |
| 5,154,514 A | | 10/1992 | Gambino et al. | |
| 5,289,043 A | | 2/1994 | Marshall et al. | |
| 5,401,099 A | | 3/1995 | Nishizawa et al. | |
| 5,781,076 A | | 7/1998 | Iwamatsu et al. | |
| 5,955,793 A | | 9/1999 | Khadkikar et al. | |

* cited by examiner

*Primary Examiner*—Kim Huynh
(74) *Attorney, Agent, or Firm*—Harness, Dickey & Pierce, P.L.C.

(57) ABSTRACT

A temperature control circuit provides for optical isolation, dry start protection, dedicated load control, manual reset, and relay control in hot water heaters and related applications. The control circuit removes power from a load at a first temperature, and includes a first optical isolation device, a first diode temperature sensor, and a first switching mechanism. The first optical isolation device controls operation of a power source, where the power source is provided to the load, such as a hot water heater heating element. The first diode temperature sensor is biased to provide a switching signal at the first temperature. The first switching mechanism is disposed between the first diode temperature sensor and the first optical isolation device, where the first switching mechanism disengages operation of the first optical isolation device in response to the switching signal. The control circuit can further include a high limit cycling circuit for disengaging operation of the power source at the second temperature. A latching circuit can be used to maintain the temperature control circuit in a switched state until a manual reset occurs.

22 Claims, 15 Drawing Sheets

Vcc
100
106
112
110
104
Q1
Q2
102
108

170
168
Vcc or V+

HIGH SENSITIVITY DIODE TEMPERATURE SENSOR WITH ADJUSTABLE CURRENT SOURCE

CROSS REFERENCE TO RELATED APPLICATIONS

The present application is a continuation-in-part of prior application Ser. No. 09/370,804 filed Aug. 9, 1999 abandoned and entitled High Sensitivity Diode Temperature Sensor With Adjustable Current Source which is a continuation of application Ser. No. 09/023,013 filed Feb. 11, 1998, now U.S. Pat. No. 5,955,793 issued Sep. 21,1999.

BACKGROUND OF THE INVENTION

The present invention is directed toward the field of solid state temperature sensors. In particular, a high-sensitivity diode temperature sensor circuit is disclosed that preferably comprises a reverse-biased diode, such as a Schottky diode, coupled to an adjustable constant current source for biasing the diode into a reverse operating region. The constant current source biases the diode at a particular reverse leakage current that corresponds to a temperature window over which the reverse voltage across the diode exhibits a linear response of several hundred mV/C. The adjustable reverse leakage current sets the beginning of the temperature window over which the diode's reverse voltage will respond. This large change in diode voltage (from 100–500 mV/C) over a relatively small temperature window (from 5–20 ° C.) can be used as a signal to switch power to an attached electrical load.

In addition to disclosing the temperature sensor, the present application describes a control circuit that incorporates, as one element, the high sensitivity diode temperature sensor. The control circuit includes an innovative feedback mechanism that, in combination with the temperature sensor circuit, enables the controller to switch a load on and off at two adjustable set points using the single temperature sensor.

Presently known solid state temperature sensor circuits include: (1) integrated circuit temperature sensors; (2) forward-biased diode temperature sensors; (3) NTC/PTC thermistor circuits; and (4) complex reverse-biased diode temperature sensors that lack sensitivity and adjustability. Each of these presently known methods of measuring temperature suffer from several disadvantages that make them commercially or technically undesirable.

Integrated circuit ("IC") temperature sensors typically measure temperature using a pair of back-to back forward-biased diode junctions. The difference in the biasing current level between the two diodes indicates the sensed temperature. Examples of these types of IC sensors include the TMP12 from Analog Devices and the LM 34/35, available from National Semiconductor. These types of IC sensors suffer from several disadvantages. First, they are complex circuits that require external biasing and range-setting components, and thus consume valuable real estate on a printed circuit board ("PCB"). Second, they exhibit a relatively low temperature sensitivity (measured as the voltage output per degree of temperature change) in the range of only 5 to 20 mV/C. And third, they are expensive in comparison to discrete component circuits.

It is also known to use a discrete forward-biased diode as a temperature sensor. This type of sensor is disadvantageous, however, because a forward-biased diode exhibits a nonlinear change in output voltage with respect to temperature, and because the temperature sensitivity of such a forward-biased junction is very low, on the order of only −2 mV/C. In addition, the forward voltage drop from diode to diode in a given lot is generally inconsistent, which means that the biasing circuitry needed to operate such a diode must be customized for each sensor, if the circuits are to operate over the same temperature ranges. Furthermore, sensors that employ forward-biased diodes are generally not easily adjusted to switch at a different temperature point.

Another known solid state temperature sensor is the thermistor, either NTC or PTC. The thermistor circuit is relatively inexpensive and uncomplicated, however, it lacks adjustability. In addition, thermistor circuits that are biased to provide a narrow temperature "window" over which switching takes place generally require expensive high-gain amplification circuits.

Several prior art patents describe attempts to develop a high-sensitivity, adjustable solid state temperature sensor using a reverse-biased diode. These patents include U.S. Pat. No. 5,070,322 to Fujihira ("Fujihira"), U.S. Pat. No. 3,719, 797 to Andrews ("Andrews"), and U.S. Pat. No. 3,420,104 to Troemel ("Troemel").

Fujihira describes an overheating detection circuit including a reverse biased-diode coupled to a series of current amplification states that amplify the reverse leakage current ($I_L$) and provide this current to a MOSFET that converts the amplified current ($I_F$) to a voltage. Fujihira does not include an adjustable constant current source that can be used to program the temperature setpoint at which the device switches, and, in addition, requires a costly and complex series of emitter-follower transistors for amplifying the leakage current of the diode sensor.

Andrews describes a sensor employing a pair of series connected reverse-biased Schottky diodes having dissimilar barrier heights. This circuit is not easily adjustable, does not employ a constant current source, and does not operate linearly over a particular temperature range. In addition, it requires the precise selection of two diodes having particular barrier heights.

Troemel describes a temperature sensor using a zener diode biased into its reverse-breakdown region. This circuit has a relatively poor sensitivity, does not employ an adjustable constant current source, and its temperature switch point is not easily changed.

Therefore, there remains a need in the art of solid state temperature sensors for an inexpensive, adjustable high sensitivity temperature measurement device that exhibits a linear output response over a narrow temperature window that can be used as a signal to switch a motor, heater, lamp or other component that could be damaged by operating outside the temperature window.

Another leading concern with temperature control in heater-based appliances such as hot water dispensers, coffee makers, slow cookers and hot water controllers, is the need for dry start protection. For example, if a hot water dispenser is turned on while empty, significant damage can be done to the vessel, heating element, and other surrounding devices. Thus, it is desirable to prevent the heating element from energizing under certain conditions. It is also desirable to provide a latching mechanism which requires a manual reset before heating can continue. This feature would allow additional protection. Relay drivers are also often used in conjunction with temperature control circuitry. It is therefore desirable to provide temperature control which can be switched to a relay.

SUMMARY OF THE INVENTION

The present invention overcomes the problems noted above and satisfies the needs in this field for a solid state temperature sensor that is inexpensive, adjustable, and exhibits a linear response and high temperature sensitivity over a programmable window of operation. The preferred sensor is a reverse-biased diode, and in particular a reverse-biased Schottky diode. Coupled to the reverse diode is a constant current source that includes an adjustable component for setting the position of the switching window over which the diode exhibits a linear change in voltage with respect to temperature.

Certain types of mechanical devices, such as motors, heaters, lamps, compressors, etc., can be damaged if they are operated in an ambient environment that is either too hot or too cold. The present invention provides an adjustable temperature sensor that, in combination with a logic circuit and power switch, can be used to protect one of these mechanical devices by supplying a voltage level to the logic circuit that causes the power switch to remove power from the protected device. This sensor is highly immune to noise, and is therefore well suited for use in an appliance or other noisy environment, due to the fact that it exhibits a high temperature sensitivity of several hundred millivolts per degree Celsius over a narrow temperature window. The sensor can easily be used in a variety of applications and ambient temperature environments due to its included adjustable current source that is used to program the sensor to transition from a high reverse voltage to a low reverse voltage in a linear fashion over the temperature window.

A preferred application of the high sensitivity diode temperature sensor is a controller for controlling the application and removal of power from a load in a refrigeration, heat pump or air conditioning application, such as a defrost heater for a freezer, although, alternatively, the sensor can be used with a wide variety of appliances and other systems that need to switch power to a particular mechanical or electrical device when the ambient temperature of the system exceeds or falls below a particular level. As used in the preferred control circuit, the present invention includes the high-sensitivity diode temperature sensor, a feedback adjustment circuit, driver transistor, and a relay. The combination of the diode temperature sensor circuitry and the feedback adjustment circuit enables the preferred controller to switch at two adjustable temperature setpoints using only a single diode temperature sensor.

The present invention provides many advantages over presently known solid state temperature sensors, including: (1) the output of the sensor exhibits a linear voltage response over a relatively small temperature window, which can be used as a signal to switch power to a load; (2) the sensor is low cost and utilizes discrete components; (3) the sensor output is adjustable by altering the reverse leakage current provided by the constant current source; (4) the sensor provides a relatively high temperature sensitivity in the range of 100–500 mV/C over the linear temperature window; (5) when used as a temperature measuring device (and not a switch), the sensor provides an accuracy of about +/−0.1° C.; and (6) the sensor is small in size, inexpensive to build and operate, and exhibits consistent operating characteristics from sensor to sensor.

In another preferred application, the diode temperature sensor of the present invention can be used in multiple sensor configurations for dry start protection, with multiple optical isolation devices for separate load control, with latching and manual reset circuitry, and with improved relay control systems. For example, the present invention provides a temperature control circuit for removing power from a load at a first temperature. The temperature control circuit has a first optical isolation device controlling operation of a power source, wherein the power source provides power to the load. A first diode temperature sensor is biased to provide a switching signal at the first temperature. The temperature control circuit further includes a first switching mechanism disposed between the first diode temperature sensor and the first optical isolation device. The first switching mechanism disengages operation of the first optical isolation device in response to the switching signal. This configuration allows control of a low-cost power supply with a triac. Furthermore, a high limit cycling circuit disengages operation of the first optical isolation device at a second temperature. This allows dry start protection through multiple sensing diodes with unique trip-point temperatures.

The present invention further provides for a latching circuit for maintaining a temperature control circuit in a latched state until a manual reset occurs. The latching circuit includes a bipolar transistor shunted across an optical isolation device, a silicon controlled rectifier connected in series with the bipolar transistor, and a manual reset switch connected in series with the optical isolation device. As an additional aspect of the invention, a method is provided for removing power from a load at a first temperature. The method includes the steps of controlling operation of a power source with a first optical isolation device, and biasing a first diode temperature sensor to provide a switching signal at the first temperature. Operation of the first optical isolation device is disengaged in response to the switching signal. The method further provides for disengaging operation of the power source at a second temperature.

These are just a few of the many advantages of the present invention, as described in more detail below. As will be appreciated, the invention is capable of other and different embodiments, and its several details are capable of modifications in various respects, all without departing from the spirit of the invention. Accordingly, the drawings and description of the preferred embodiments set forth below are to be regarded as illustrative in nature and not restrictive.

BRIEF DESCRIPTION OF THE DRAWINGS

The present invention satisfies the needs noted above as will become apparent from the following description when read in conjunction with the accompanying drawings wherein.

DETAILED DESCRIPTION OF THE PREFERRED EMBODIMENT

Figure 1:
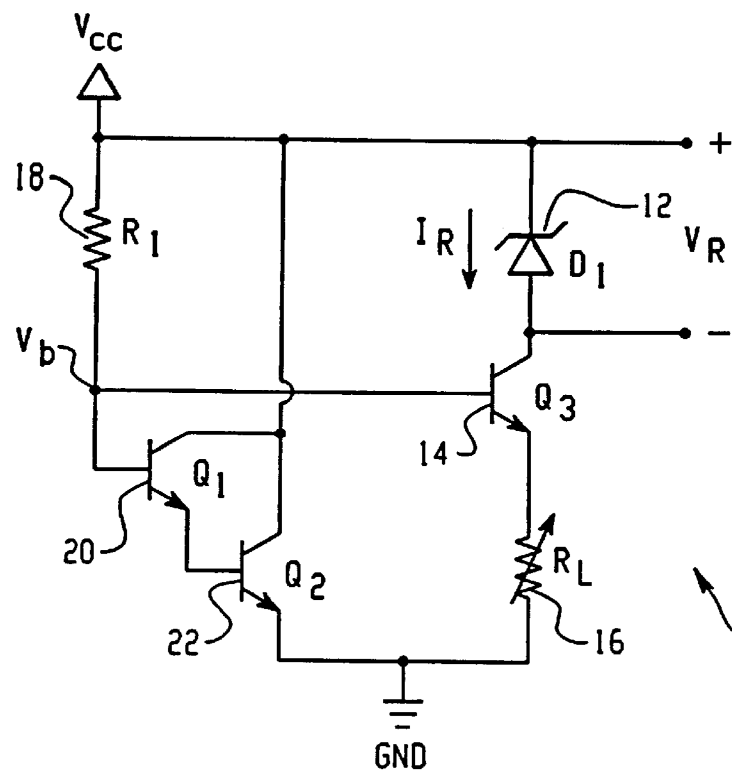
FIG. 1 is a circuit schematic of a preferred embodiment of a solid state temperature sensor having a reverse-biased Schottky diode coupled to an adjustable constant current source.

Referring now to the drawings, FIG. 1 sets forth a circuit schematic of a preferred embodiment of a solid state temperature sensor 10 having a reverse-biased Schottky barrier diode 12 coupled to an adjustable constant current source.

In the preferred embodiment of the present invention, the high-sensitivity diode sensor includes a reverse-biased Schottky diode 12, although other types of diodes that exhibit a relatively large reverse leakage current $I_R$ could be substituted for the Schottky diode 12.

The adjustable constant current source preferably includes bipolar junction transistors Q1, Q2 and Q3 20, 22, 14, biasing resistor R1 18, and adjustable resistor $R^L$ 16. Other circuit configurations for the adjustable constant current source could be used in place of these elements, including a single transistor constant current source, many types of multi-transistor constant current sources, or op-amp current sources, to name a few. The important feature of a constant current source for use with the present invention is the ability to easily adjust the reverse leakage current $I_R$ that the constant source pulls through the reverse-biased diode D1 12.

The constant current source operates as follows. Biasing resistor R1 18 and bipolar transistors Q1 20 and Q2 22 create a voltage level at node $V_B$ that is two $V_{BE}$ drops higher than the ground node. The two $V_{BE}$ drops correspond to the forward biased base-emitter junctions of Q1 20 and Q2 22. The voltage at node $V_B$ minus $V_{BE}$ of Q3, divided by the value of $R_L$, sets the current $I_R$ that the constant current source will try to pull through the diode sensor D1 12. The reverse leakage current $I_R$ that is applied to the diode sensor D1 12 can be adjusted by either varying the value of $R_L$, or by replacing $R_L$ with a different resistor. $R_L$ can be either a fixed resistor, in which case the resistor is replaced with a different valued resistor to adjust $I_R$, or it can be a potentiometer or variable resistor, in which case the potentiometer is varied to adjust $I_R$. In either case, the reverse leakage current $I_R$ can be easily adjusted in the circuit of the present invention.

The diode sensor D1 is preferably a Schottky diode, but could alternatively be other types of diodes that exhibit large (>1 uA) reverse leakage currents. The Schottky diode, which is a metal-semiconductor junction, exhibits a relatively large (typically in the range of 10–75 uA) reverse leakage current. Because of this characteristically large reverse leakage current, costly and more complex amplification stages, as is known in some prior art circuits, are not required with the present invention. The reverse leakage current $I_R$ of a Schottky diode varies as a function of temperature (the greater the temperature, the larger the reverse leakage current). By fixing the reverse leakage current $I_R$ through the diode using a constant current source, the reverse voltage drop across the diode $V_R$ is forced to vary with a change in temperature from about 4.15V to about 0.1V. This voltage variation occurs over a fairly narrow temperature window of about 10–15° C., and within this temperature window the response of the diode (delta $V_R$ versus delta T) is nearly linear. Thus, over a narrow temperature delta of about 10–15° C., the sensor exhibits a very high sensitivity, typically on the order of 100–500 mV/C.

Figure 2:
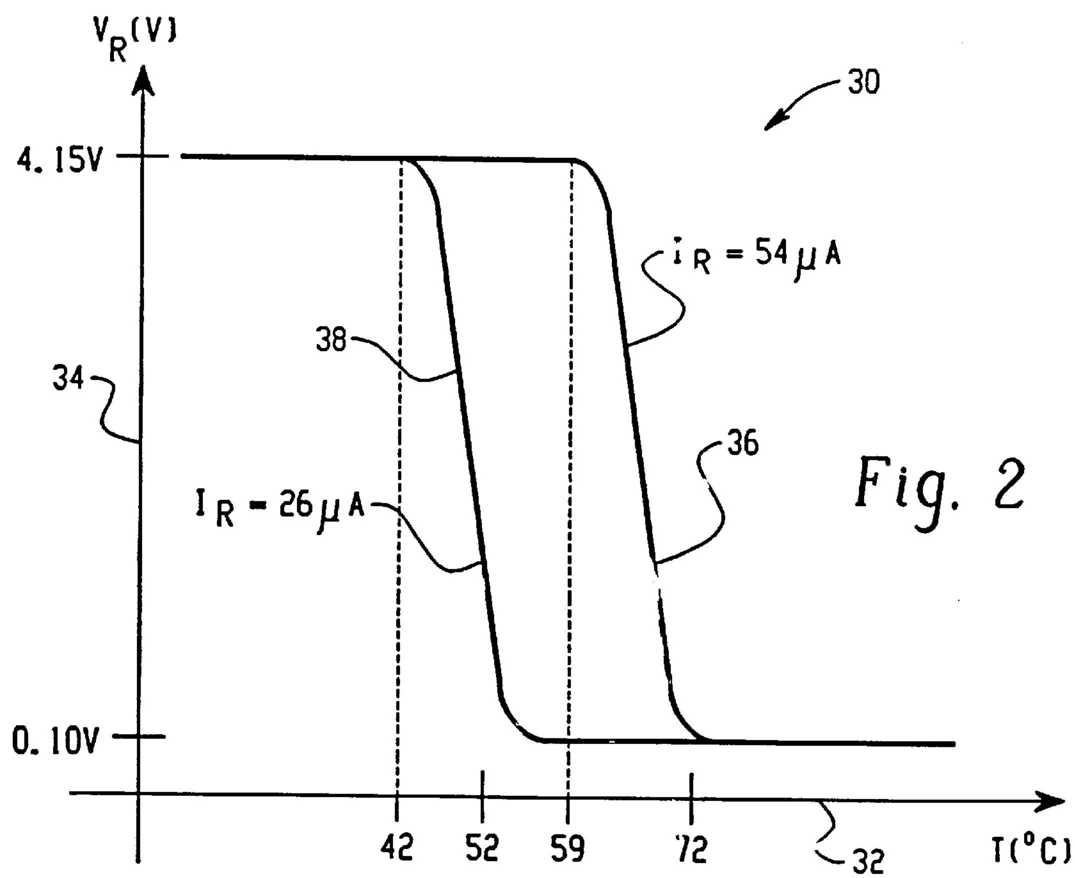
FIG. 2 is a typical plot of the reverse voltage ($V_R$) versus temperature (T) for the reverse-biased Schottky diode in FIG. 1 at two operating currents.
Figure 3:
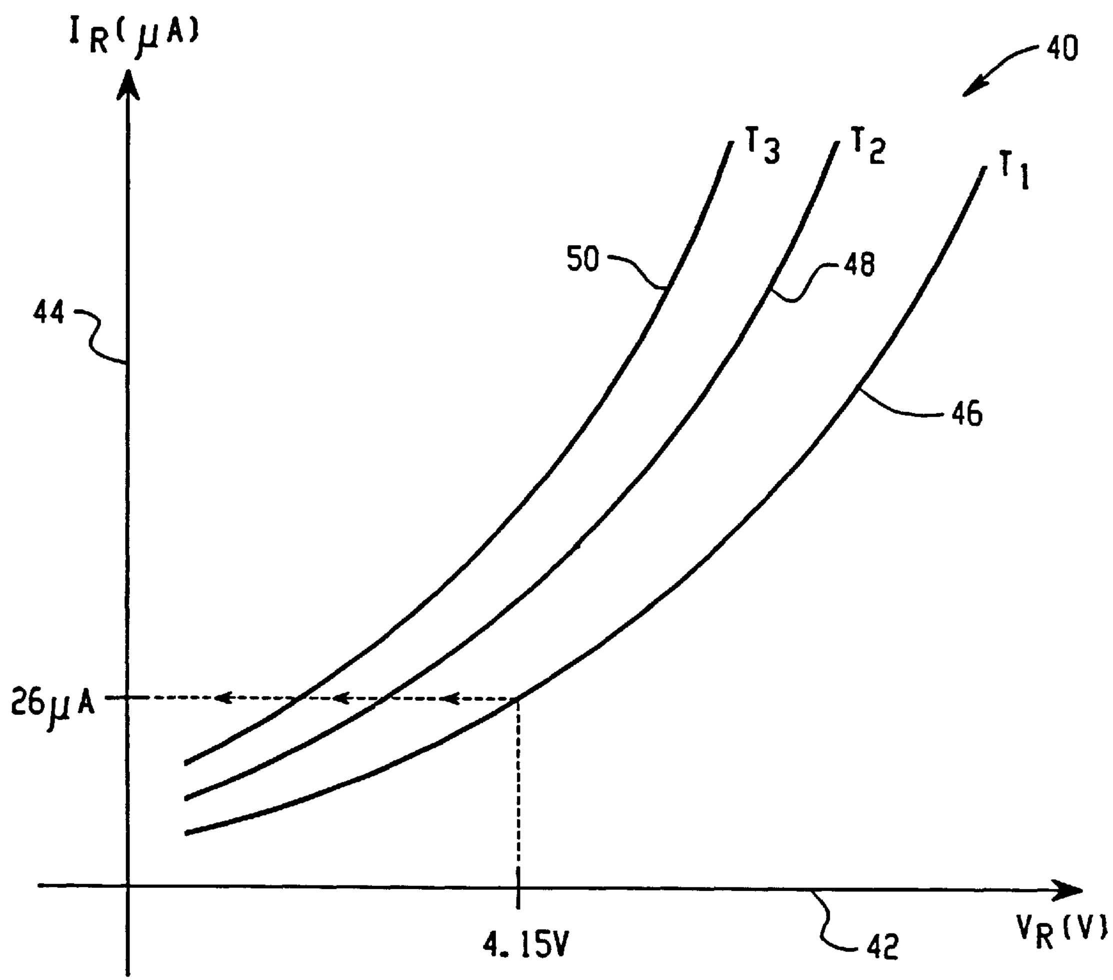
FIG. 3 is a typical plot of the reverse current ($I_R$) versus reverse voltage ($V_R$) for the reverse-biased Schottky diode in FIG. 1 at three example temperatures (T1–T3)'.

FIGS. 2 and 3 describe graphically the electrical operation and behavior of the circuit of FIG. 1. FIG. 2 is a typical plot of the reverse voltage ($V_R$B) versus temperature (T) for the reverse-biased Schottky diode in FIG. 1 at two operating currents. The plot 30 sets forth voltage $V_R$ measured in volts (V) on the Y-axis 34, and temperature T measured in degrees Celsius (C) on the X-axis 32. Two operating points are shown in the plot, the first point 38 at a constant current IR of 26 uA, and the second point 36, at a constant current $I_R$ of 54 uA. This plot shows how adjusting the reverse leakage current $I_R$ causes a change in the temperature at which the diode voltage begins to switch (42° C. for a reverse current of 26 uA and 59° C. for a reverse current of 54 uA).

Consider curve 38. At a temperature below 42° C., the reverse voltage $V_R$ across the diode 12 is constant, about 4.1 5V. This operating region represents the compliance limit of the constant current source. Any constant current source is limited by how much voltage it can provide to maintain the constant current. As the ambient temperature drops below 42° C., in this example curve, the current source reaches its compliance limit and the reverse voltage $V_R$ across the diode D1 is essentially clamped at 4.15V (Vcc is about 5V in this example). Since the voltage $V_R$ is constant in this region, as the temperature continues to decrease, so does the current $I_R$.

Now assume that the temperature is increasing on curve 38. As the temperature increases to 42° C., the constant current source returns to its adjusted level of 26 uA. Then, as the temperature continues to increase, the reverse voltage across the diode $V_R$ begins to collapse. As the temperature continues to increase the voltage across the diode $V_R$ will continue to fall as a linear function of temperature, until the voltage reaches a minimum value that is a characteristic of the properties and structure of the diode D1 12. In the example of plot 30, the minimum reverse voltage drop that can be established across the diode is 0.1V.

This operating region, from 42° C. to 52° C., represents a temperature "window" over which the reverse voltage response of the diode 12 exhibits a linear temperature dependence of several hundred millivolts per degree Celsius (mV/C). In the example of curve 38, the voltage drops from 4.15V to 0.1V over a span of approximately 10° C., resulting in a linear sensitivity of about 400 mV/C. Thus, over a fairly narrow temperature range (about 10° C.), the sensor of the present invention provides a very high sensitivity and a linear response.

As shown in FIG. 2, the output voltage $V_R$ of the diode sensor 12 operates like a temperature-dependant switch signal that can be used to protect motors, heaters, lamps or other potentially temperature sensitive elements that cannot operate above or below a particular temperature. The point at which the sensor "switches" can be easily adjusted in the circuit of the present invention by adjusting $R_L$, which moves the switching "window" up and down the X-axis of FIG. 2.

For example, consider a precision motor that will overheat and become damaged if it is operated in an ambient temperature environment that is greater than 72° C. The circuit of FIG. 1, adjusted such that the reverse leakage current $I_R$ is 54 uA, as shown in curve 36 of FIG.2, provides a solution to protect this motor. By adjusting $R_L$ in FIG. 1 so that the reverse leakage current $I_R$ pulled from the diode is 54 uA, the output voltage of the diode can be programmed to collapse at about 72° C. This easily detectable voltage signal can then be coupled to a logic circuit and a power switch, such as a triac or a relay, to remove power from the sensitive motor when the temperature exceeds the threshold. Conversely, the circuit of FIG. 1 could be used to protect a device that cannot operate below a particular temperature, in which case the logic circuitry coupled to the output of the diode sensor 12 would operate by sensing a low-to-high reverse voltage transition, rather than a high-to-low transition as exhibited by increasing temperatures.

FIG. 3 sets forth a typical plot of the reverse current ($I_R$) versus reverse voltage ($V_R$) for the reverse-biased Schottky diode in FIG. 1 at three example temperatures (T1–T3). The plot 40 sets forth voltage $V_R$ measured in volts (V) on the X-axis 42, and current $I_R$ measured in micro-amps (uA) on the Y-axis 44. Three temperatures are plotted, T1, T2, and T3, respectively numbered 46, 48 and 50. In the plot, T1 is less than T2, which is less than T3. The plots show how the reverse-voltage $V_R$ varies as a function of temperature when the reverse leakage current $I_R$ is held constant.

Consider a constant current supply of 26 uA, as labeled on FIG. 3. At temperature T1, or less, the current source is operating in its compliance limit and the reverse voltage $V_R$ across the diode 12 is 4.15V. As the temperature increases to T2 and then T3, the voltage across the diode drops in a linear fashion. Adjusting the reverse leakage current moves the operating point at which the diode begins to operate linearly to a higher or lower temperature, depending on whether the current $I_R$ is raised or lowered.

Figure 4:
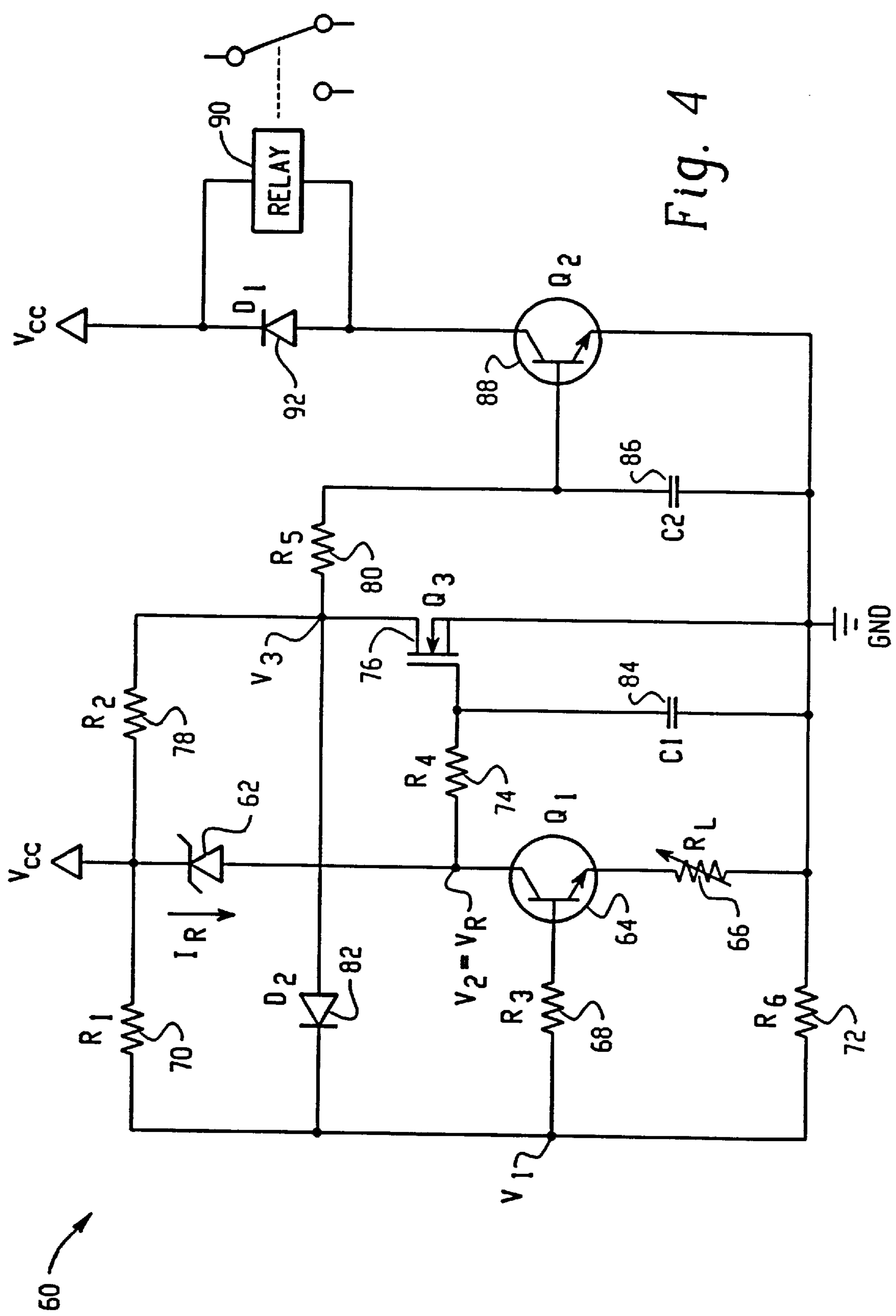
FIG. 4 is a circuit schematic of a defrost control circuit for refrigeration, heat pump or air conditioning applications including a high sensitivity diode sensor with adjustable current source.

Turning now to FIG. 4, a preferred application of the high-sensitivity diode sensor described in FIGS. 1–3 is presented. This circuit is a defrost controller that finds its primary use within a refrigeration unit, a heat pump, or an air conditioner, but which could be used in conjunction with other appliances. The circuit 60 includes a high-sensitivity diode temperature sensing circuit as described above, a feedback control circuit, a bipolar driver, and a switch.

The high-sensitivity diode temperature sensing circuit includes a reverse-biased Schottky diode DS 62, bipolar transistor Q1 64, biasing resistors R1 70, R3 68 and R6 72, and adjustable current setting resistor $R_L$ 66. The feedback control circuit includes a resistor R44 74, capacitor C1 84, MOSFET transistor Q3 76, biasing resistor R2 78 and feedback diode D2 82.

Figure 5:
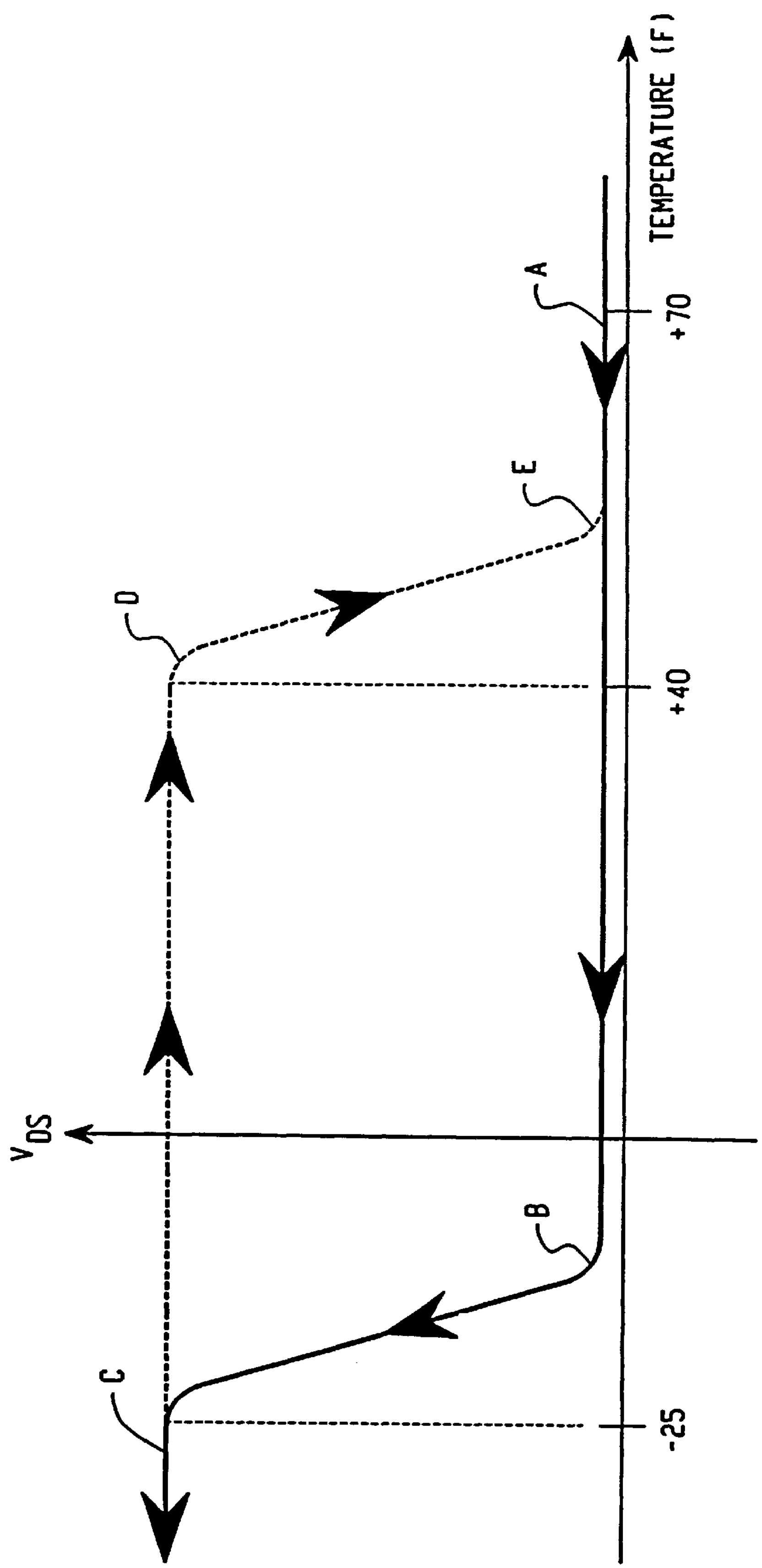
FIG. 5 is a typical plot of the reverse voltage (VR) versus temperature (T) for the reverse-biased Schottky diode temperature sensor as used in the defrost control circuit of FIG. 4, showing the dual temperature switchpoint operation of the sensor.

The high-sensitivity diode temperature sensing circuit generally operates as described above in connection with FIGS. 1–3, except that in combination with the feedback control circuit, the temperature sensor of FIG. 4 exhibits a switching characteristic at two distinct temperature points, as shown in FIG. 5. The two switching points shown are at $T_{low}$=−25° F. (point C) and $T_{high}$=+40° F. (point D). These two points represent the temperatures at which the load connected to the defrost control circuit, typically a resistive heater, is turned on ($T_{low}$) and turned off ($T_{high}$).

For purposes of describing the operation of the defrost control circuit, assume that the ambient temperature is initially +70° F., point A on FIG. 5. At this temperature, R1, R3, $R_L$ and R6 set the reverse leakage current $I_R$ through the Schottky diode so that the voltage drop across the diode $V_{DS}$ is small, on the order of 0.1V. The voltage at node V2 in FIG. 4 (the output of the temperature sensor) is therefore high. When V2 is high, the gate-to-source voltage ($V_{GS}$) across the MOSFET Q3 is greater than its threshold voltage ($V_T$), resulting in a high drain-to-source current ($I_{DS}$) through the MOSFET, which pulls the voltage at node V3 low. When V3 is low, bipolar driver Q3 is off and not conducting, which means that the relay 90 that applies power to the heater load is de-energized. An additional effect of V3 being low is that feedback diode D2 is reversed-biased, and the voltage at node V1 (which partly establishes the reverse leakage current $I_R$ through the reverse-biased diode temperature sensor 62) is at a low value, thus setting the first thermal switch point to be at −25° F. ($T_{low}$).

As the ambient temperature decreases along the solid black line in FIG. 5 from +70 to +40 to −25° F., $V_{DS}$ increases, causing V2 to decrease. The voltage reduction at node V2 causes $V_{GS}$ of Q3 to fall below the threshold value ($V_T$), which turns off the MOSFET. With no current flow ($I_{DS}$) through resistor R2, node V3 rises to a voltage level that will turn the driver transistor Q2 on and energize the relay 92, which applies power to the heater. With V3 no longer at a low value, feedback diode D2 becomes forward biased, causing the current through R6 to increase. The increased current through R6 causes node VI to be at a higher voltage, thus establishing a higher reverse leakage current $I_R$ through the diode temperature sensor 62, changing its thermal switch point from the lower value of −25° F. to the higher value of +40° F.

As the heater operates it raises the ambient temperature of the appliance, causing the circuit to operate along the dotted curve from point C to point D to point E in FIG. 5. The higher reverse leakage current through diode 62 causes the reverse voltage $V_{DS}$ across the diode to remain relatively constant until approximately +40° F. (point D). Beyond this temperature $V_{DS}$ collapses, causing node V2 to rise. Eventually V2 will rise to a point where $V_{GS}$ exceeds $V_T$ of the MOSFET, thus turning the device back on. The MOSFET will start to conduct current $I_{ps}$, which causes the voltage at node V3 to drop back towards ground potential. As node V3 drops, bipolar transistor Q2 will eventually turn off, which de-energizes relay 92 and removes power from the defrost heater. The low value of V3 again reverse-biases feedback diode D2, resetting the thermal switch point back to −25° F. and the cycle can repeat.

FIG. 5 shows the dual temperature switching points (C,D) of the defrost controller of the present invention. The purpose of the defrost controller is to turn a heater on when the ambient temperature becomes too low (<−25° C.), and to turn the heater off when the ambient temperature reaches a second, higher temperature (40° C./). By using the high sensitivity diode temperature sensor of the present invention and the feedback control circuit described above, the defrost controller of FIG. 4 an produce a switching response as shown in FIG. 5, with two adjustable switchpoints for switching power to an attached heater.

Figure 6:
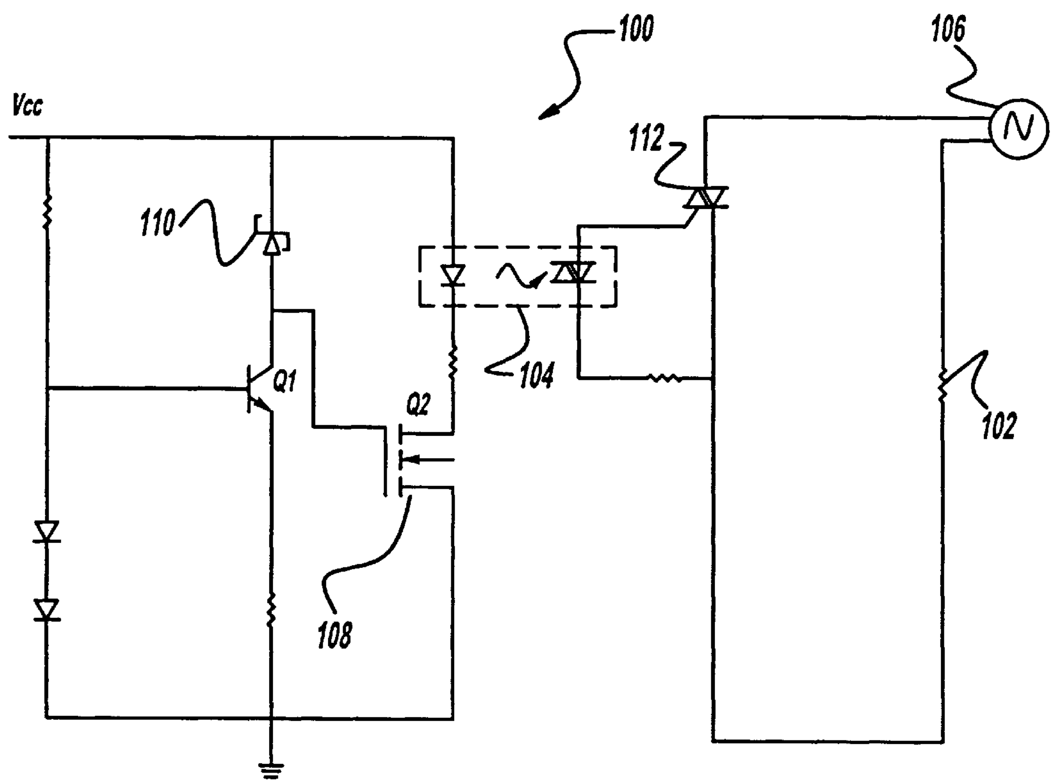
FIG. 6 is a circuit schematic of a temperature control circuit including a first optical isolation device in a shunt configuration.

It can also be appreciated that the present invention provides for optical isolation, dry start protection, dedicated load control, manual reset, and relay control in hot water heaters and related devices. For example, FIGS. 6 and 7 demonstrate optical isolation in a temperature control circuit via shunt and series connection, respectfully. Specifically, FIG. 6 shows a temperature control circuit 100 for removing power from a load 102 at a first temperature. The first temperature is preferably the higher temperature of a cycle, but can also be the lower temperature. A first optical isolation device 104 controls operation of a power source 106. Preferably, the first optical isolation device 104 is a photo-triac driver, but other optical devices well known in the art can be used. A first diode temperature sensor is biased to provide a switching signal at the first temperature as described above. The temperature control circuit 100 also includes a first switching mechanism 108 (Q2) disposed between the first diode temperature sensor and the first optical isolation device 104. It will be appreciated that the first switching mechanism 108 disengages operation of the first optical isolation device 104 in response to the switching signal. It will be further appreciated that in the configuration shown in FIG. 6, the first switching mechanism 108 is shunted across the first optical isolation device 104. Thus, when the first temperature is reached, the reverse bias current through the Schottky diode 110 increases, causing the collector of Q1 to go from a low state (approximately 0.7 volts) to a high state (approximately 5 volts). Q2 108 will turn on and the triac driver 104 will be bypassed. This will disconnect current to the heater 102 by removing the voltage from gate of triac 112.

Figure 7:
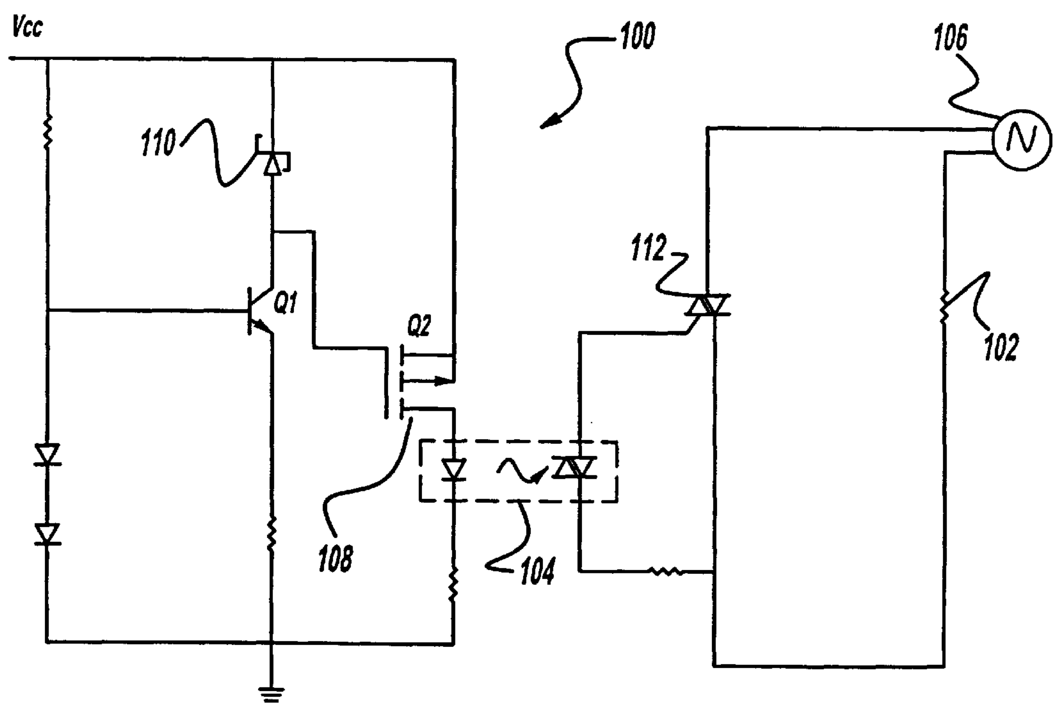
FIG. 7 is a circuit schematic of a temperature control circuit including a first optical isolation device in a series configuration.

Turning now to FIG. 7, it can be seen that Q2 108 can be connected in series with triac driver 104. This modified circuit 100' results in the same heater control as the circuit 100 of FIG. 6. Here, Q2 108 conducts while the Q1 collector is in a low state. When the Q1 collector goes high, Q2 108 interrupts the current flow to the triac driver 104, thereby shutting off current to the heater 102 in the same manner as with the shunt configuration. While the above approaches involve current-controlled SDTS designs, FIG. 21 demonstrates an alternative voltage-controlled SDTS design at 200. One benefit of using a voltage-controlled set-point is that it allows for easy dynamic adjustment.

Figure 19:
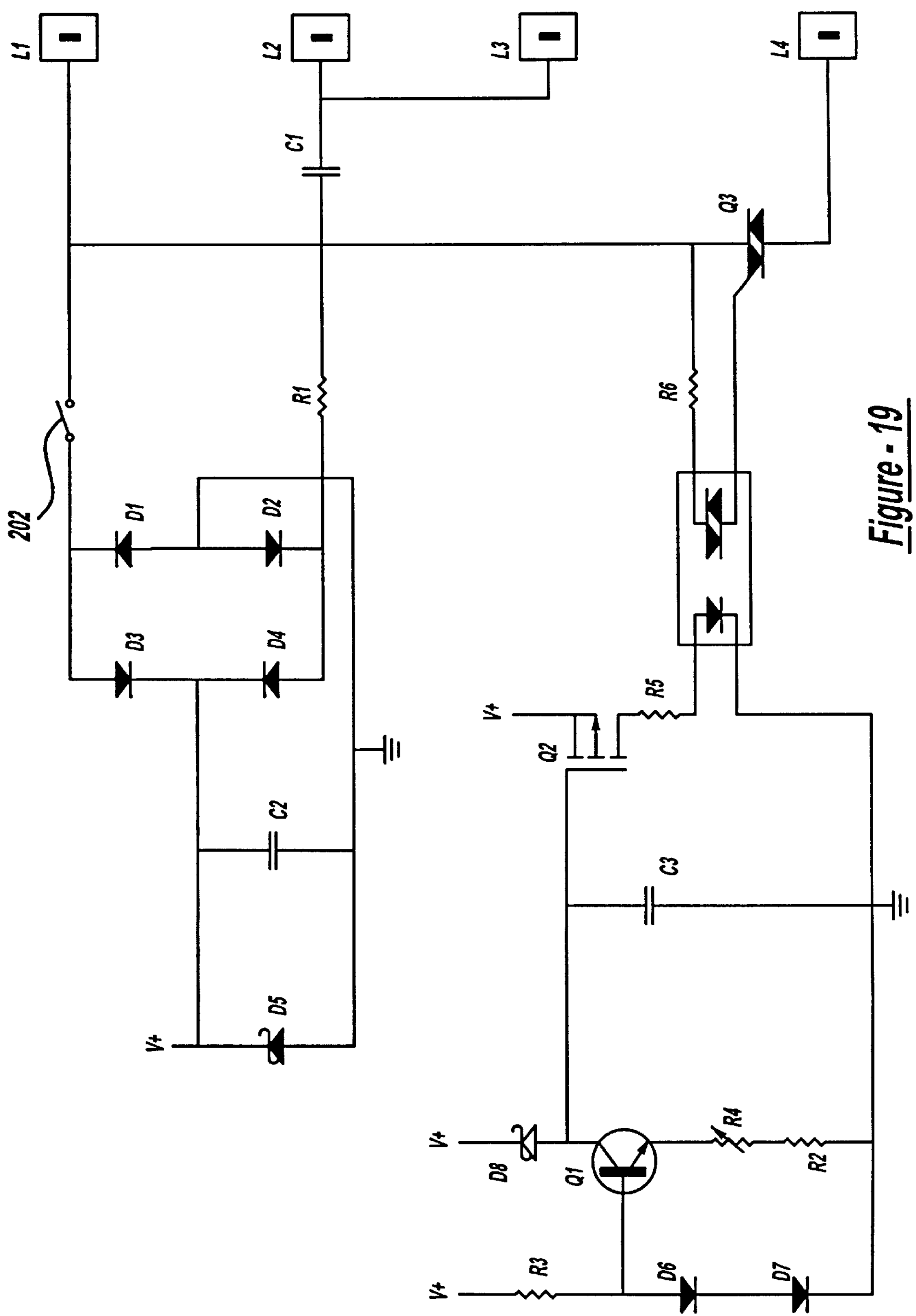
FIG. 19 is a circuit schematic of a temperature control circuit having a reed switch for dry start protection.
Figure 20:
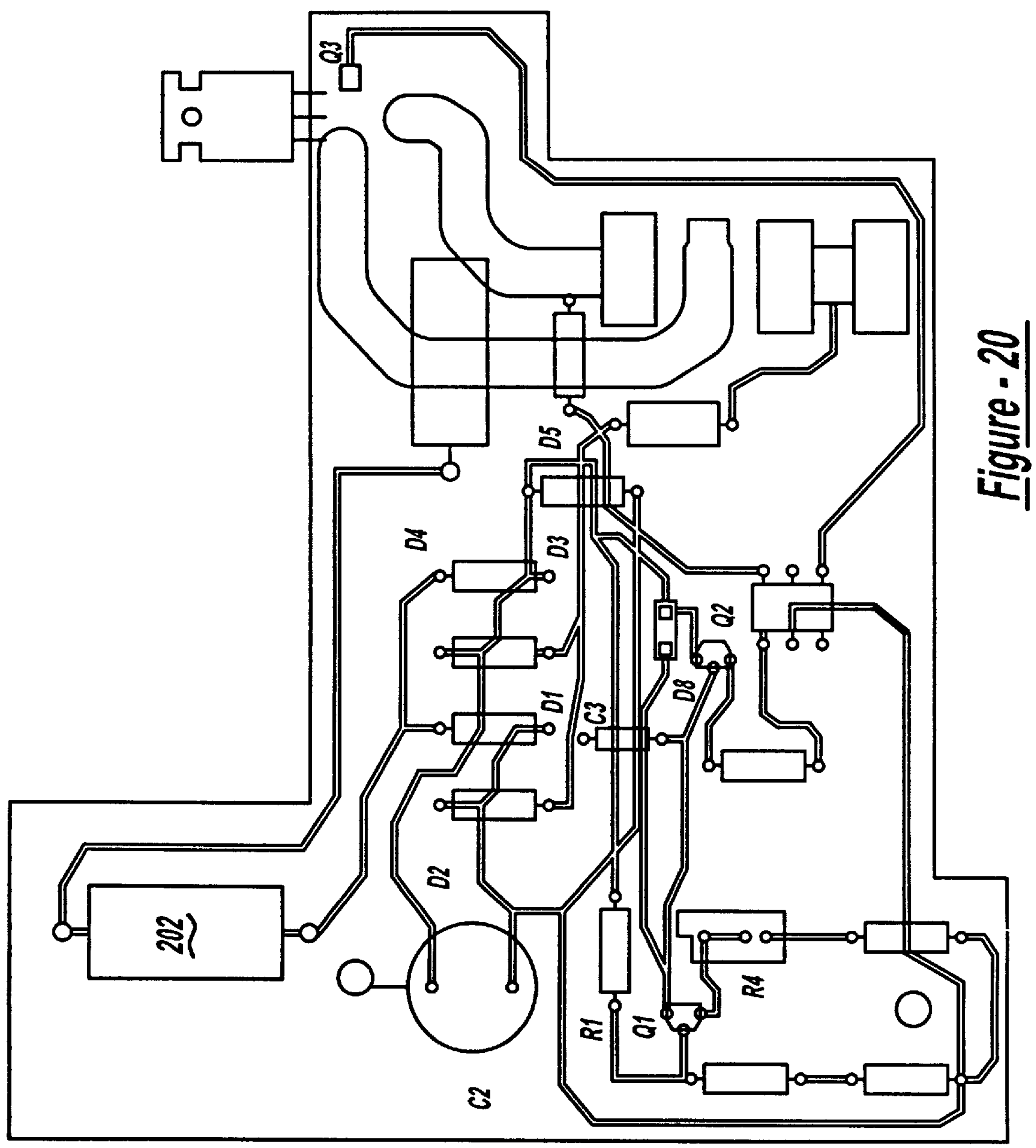
FIG. 20 is a PCB layout for the temperature control circuit of FIG. 19.

The present invention also provides for dry start protection. This prevents the heater from turning on during excessive temperatures and an all-electronic solution involves the use of multiple temperature sensors. For example, the temperature sensors can be placed at critical locations, such that each has a unique trip-point temperature above which the heating element is de-energized. Thus, in a hot water dispenser, the diode temperature sensor responsible for controlling the water temperature could be located farther away from the heater element, whereas the diode temperature sensor responsible for dry start protection may be located near or on the heater element. Mechanical solutions to dry start protection can also be implemented such as a float and reed switch 202 for level indication as shown in FIGS. 19 and 20.

Figure 8:
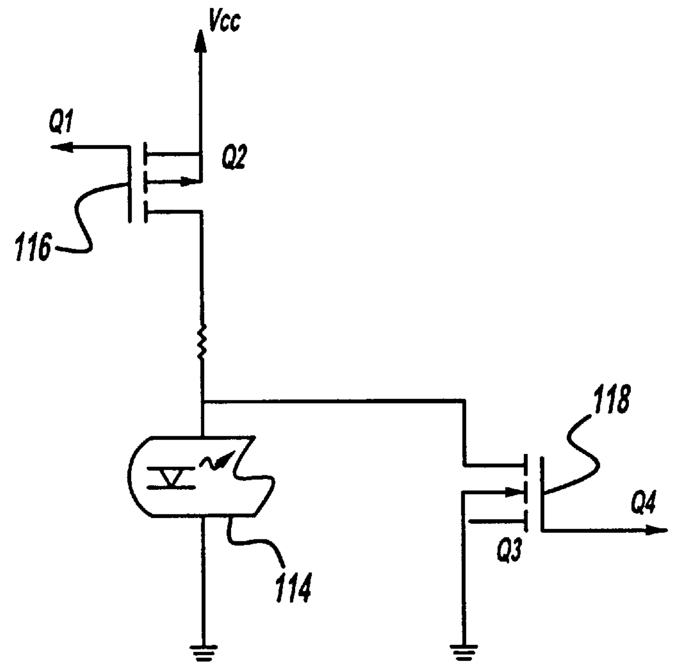
FIG. 8 is a circuit schematic of a high limit cycling circuit providing shared load control via one optical isolation device.
Figure 9:
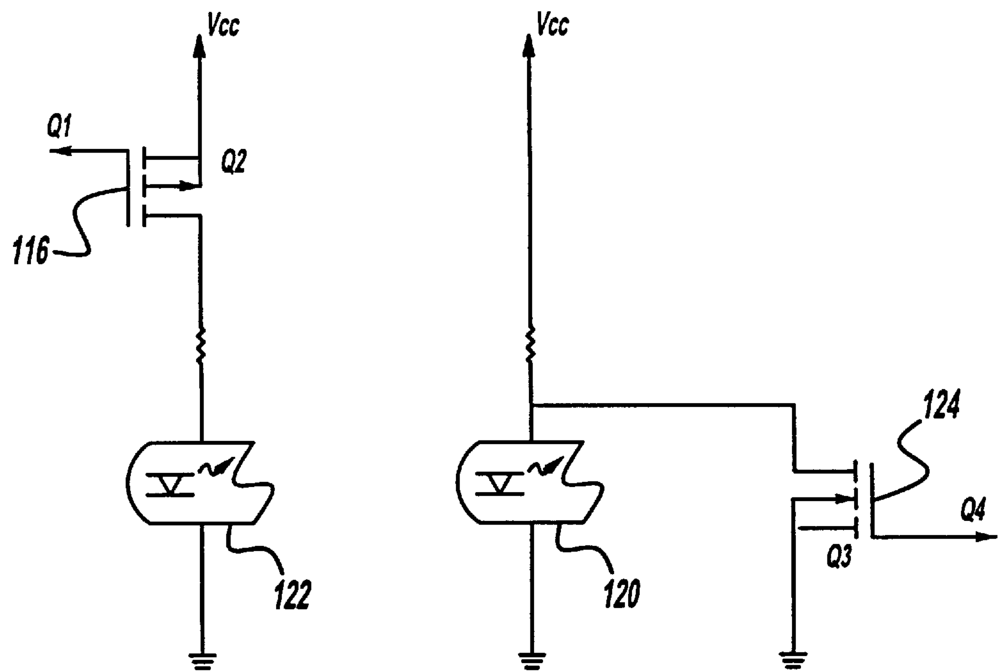
FIG. 9 is a circuit schematic of a high limit cycling circuit providing dedicated load control via two optical isolation devices.

FIGS. 8 and 9 demonstrate that the temperature sensors can be driven by a shared optical isolation device or dedicated optical isolation devices, respectively. It will be appreciated that Q1 and Q4 (not shown) are part of diode temperature sensors which can be operated in a number of ways, including those shown in FIGS. 6, 7 and 21. Specifically, FIG. 8 demonstrates that a first diode temperature sensor (not shown) and a second diode temperature sensor (not shown) provide a switching signal used by a shared optical isolation device 114. The first diode temperature sensor is used as a cycling sensor, whereas the second diode temperature sensor is used as a high limit sensor. Q1 (not shown) controls Q2 116 as a series controller. It will be appreciated that Q1 can also control Q2 116 as a shunt controller. Q1 is a Schottky diode temperature sensor (SDTS) adjusted to the cycling temperature set point. Q3 118 is controlled by another separate Schottky diode temperature sensor (not shown). The SDTS controlling Q3 118 is set to a higher temperature than the SDTS controlling Q2 116. It will be appreciated that Q3 118 disables the triac driver 114 when the Q4 collector goes high. The Q3 118 switching mechanism acts as a high-limit control and prevents further heater turn on during excessive temperatures. Heater control is restored when the Q4 collector goes low, indicating that the over temperature condition no longer exists.

Turning now to FIG. 9, dry start protection for dedicated optical isolation devices is shown. Just as in the previous example, a high limit cycling circuit disengages operation of the power source at a second temperature. Here, the high limit cycling circuit includes a second optical isolation device 120 controlling operation of the power source, wherein the second optical isolation device 120 is connected in series with the first optical isolation device 122. A second SDTS is associated with the Q4 collector (not shown) and is biased to provide a switching signal at the second temperature. A second switching mechanism 124 is coupled to the second optical isolation device 120, such that the second switching mechanism 124 disengages operation of the second optical isolation device 120 in response to the switching signal. Preferably, the first and second optical isolation devices (122, 120) are two triacs used in series with the heater for added fault protection. In this case two triac drivers and two triac driver circuits are used to control the heater. No current will flow through the heater unless both triacs are conducting. As discussed above, the Q1 sensor (not shown) is set at a lower temperature than the Q4 sensor (not shown). The Q1 collector cycles the heater through Q2 and triac driver 122 during normal operation. Triac driver 120 is on continuously, enabling the heater to be cycled. When an over temperature condition occurs, the Q4 collector goes high and thereby turns on Q3 124, which disables triac driver 120. Since the triac drivers (122,120) are in series with the heater, no heater cycling will occur until the over temperature condition disappears.

Figure 10:
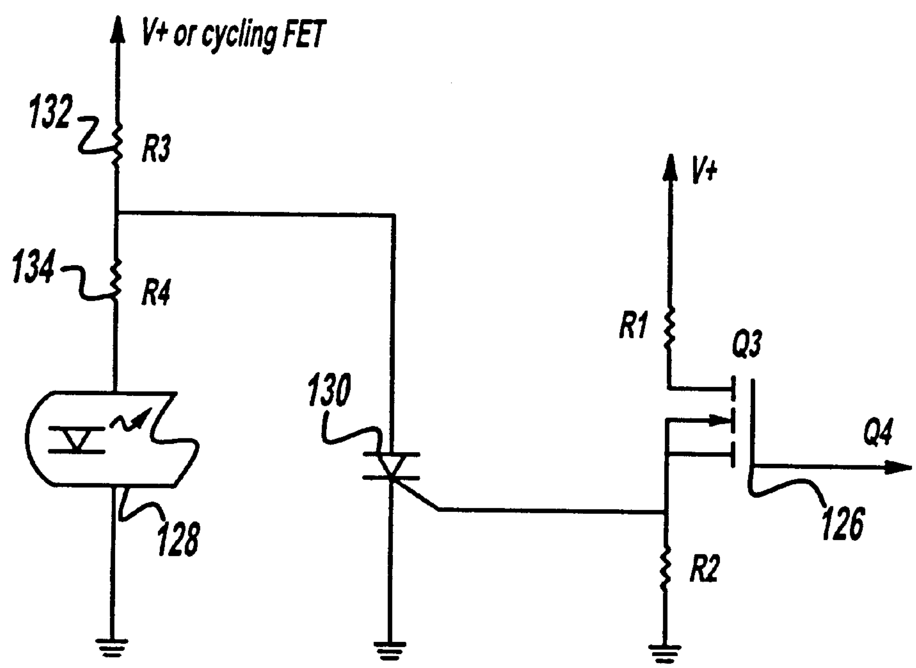
FIG. 10 is a circuit schematic of a latching circuit including a silicon controlled rectifier shunted across an optical isolation device.

The present invention further provides for latching when a temperature limit is reached. Thus, a manual reset must take place before the heater can be energized. This aspect provides added protection and is required for most applications desiring UL certification. Latching is provided for both shared and dedicated optical isolation device applications. In all cases a manual reset switch is placed in series with the high-limit triac driver or latch. The switch is used to reset the control after a fault condition. Thus, turning to FIG. 10 it can be seen that a latching circuit is disposed between a switching mechanism 126 and an optical isolation device 128. The latching circuit maintains the temperature control circuit in a switched state until a manual reset occurs. The latching circuit includes a silicon controlled rectifier 130 shunted across the optical isolation device 128, and a manual reset switch (not shown) connected in series with the optical isolation device 128.

In this configuration, a high-limit condition turns on Q3 126 causing current flow through R1 and R2. R1 and R2 are sized to provide adequate voltage and current to the gate of the SCR 130 for current to flow through the SCR. Current normally used to power the LED of triac driver 128 is therefore now used to latch the SCR. The triac driver 128 current is reduced until the triac driver 128 fails to fire. The triac driver 128 is disabled until the current through the SCR 130 is interrupted and the gate voltage, and current are below the SCR 130 trigger threshold. If the current through the SCR 130 remains above its rated holding current, the triac driver 128 control will remain disabled regardless of the state of the SCR 130 gate. The current limiting resistance is split into two resistors R3 132 and R4 134. This is because the voltage from the anode to cathode of the SCR 130 is too high to effectively shunt the triac driver 128 LED directly. Splitting the dropping resistance allow the anode to cathode voltage to be divided between one resistor and the triac driver 128 diode.

Figure 11:
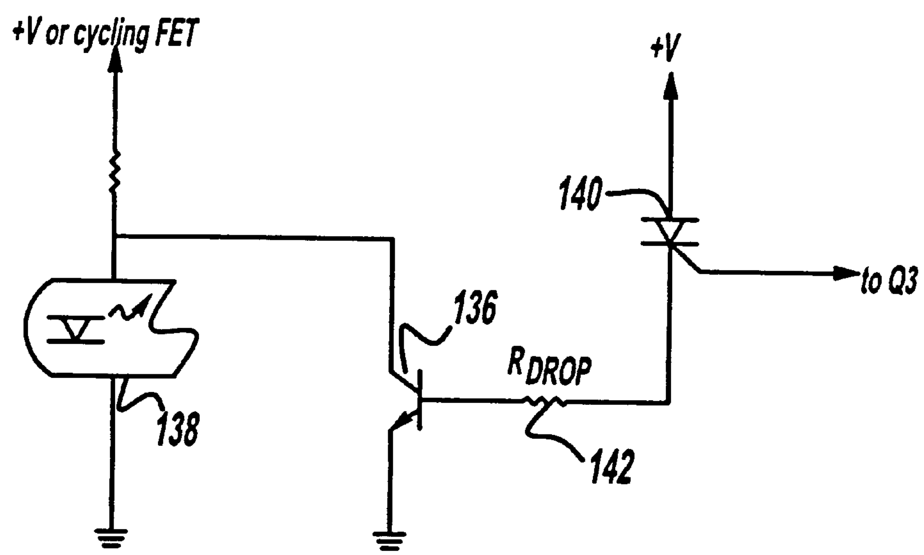
FIG. 11 is a circuit schematic of a latching circuit including a bipolar transistor shunted across an optical isolation device.

FIG. 11 demonstrates a preferred embodiment of the latching circuit of the present invention. Specifically, the preferred latching circuit includes a bipolar transistor 136 shunted across the optical isolation device 138. An SCR 140 is connected in series with the bipolar transistor 136, wherein a manual reset switch (not shown) is connected in series with the optical isolation device 138. The transistor 136 should be chosen to have a low collector-emitter voltage drop when it is in full conduction. The transistor 136 is controlled by SCR 140. A resistor $R_{DROP}$ 142 is placed in series with the base of the transistor to limit the transistor 136 base current and the anode to cathode SCR 140 current. When an over temperature condition triggers the SCR 140, current flows through the SCR 140, anode-cathode, and through the resistor 136 base-emitter junction. It is this current, SCR-transistor base, that must be interrupted to reset the control and return to normal operation. The manual reset switch would therefore be placed somewhere to interrupt this current flow. This circuit allows latching regardless of the current supplied to the triac driver 138, and a lower off-state current in the triac driver LED. The SCR 140 can drive multiple latching transistors. It will further be appreciated that the SCR 140 may be replaced by an equivalent transistor latching circuit or a latching comparator circuit.

Figure 12:
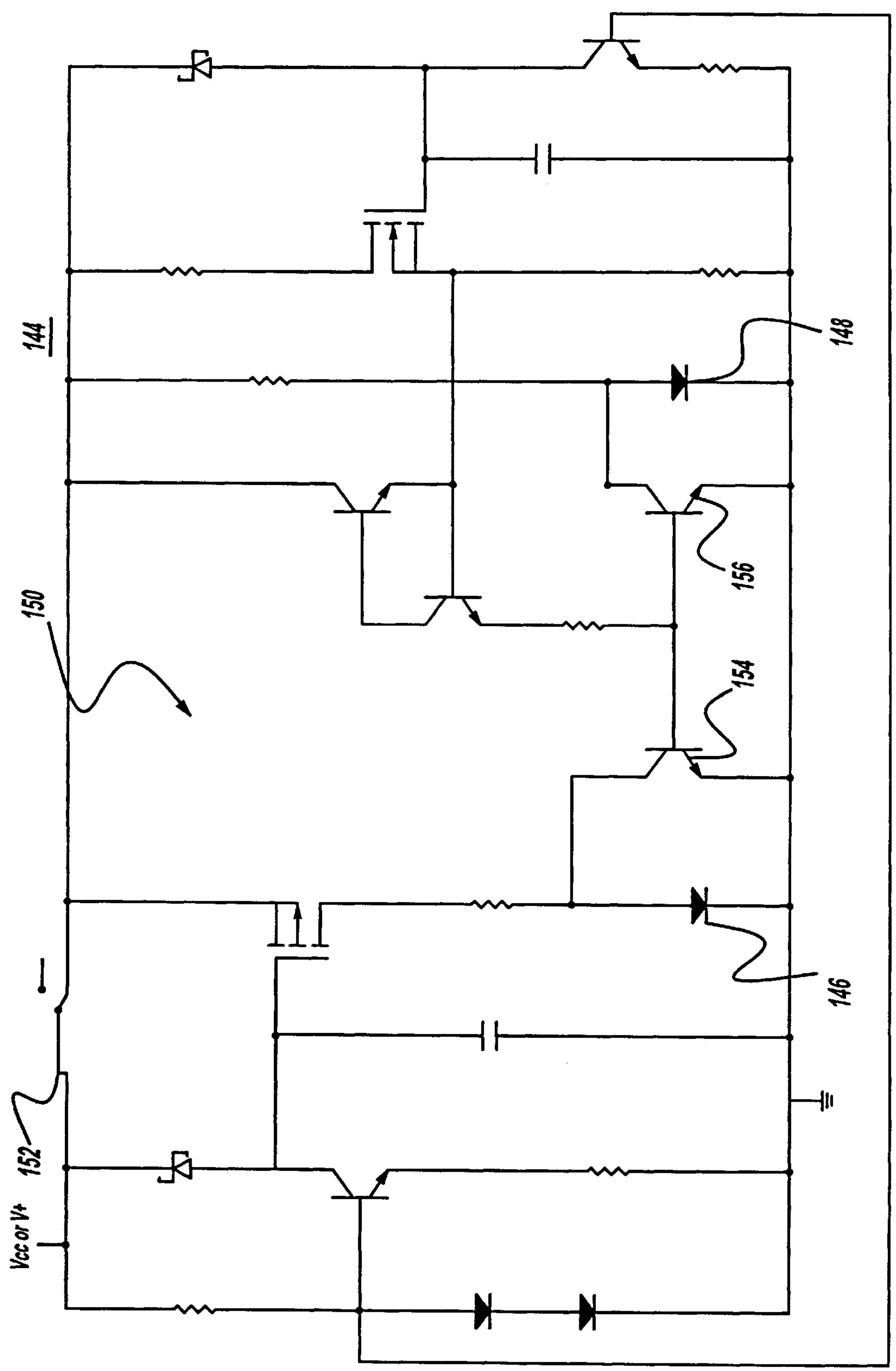
FIG. 12 is a circuit schematic of a temperature control circuit including a latching circuit for dedicated load control.

Turning now to FIG. 12, a temperature control circuit 144 for providing latching in a dedicated load control configuration with dry start protection is shown. It will be appreciated that the high limit SDTS is biased by the same voltage divider as the cycling SDTS. The triac drivers are represented as LED's 146 and 148. The latching circuit 150 disables both triac drivers 146, 148. The manual reset switch 152 can be located anywhere in series with the current path from the positive supply, through the latching transistors, through the base-emitter current path of the shunt transistors 154, 156, and the return path to the circuit power supply.

Figure 13:
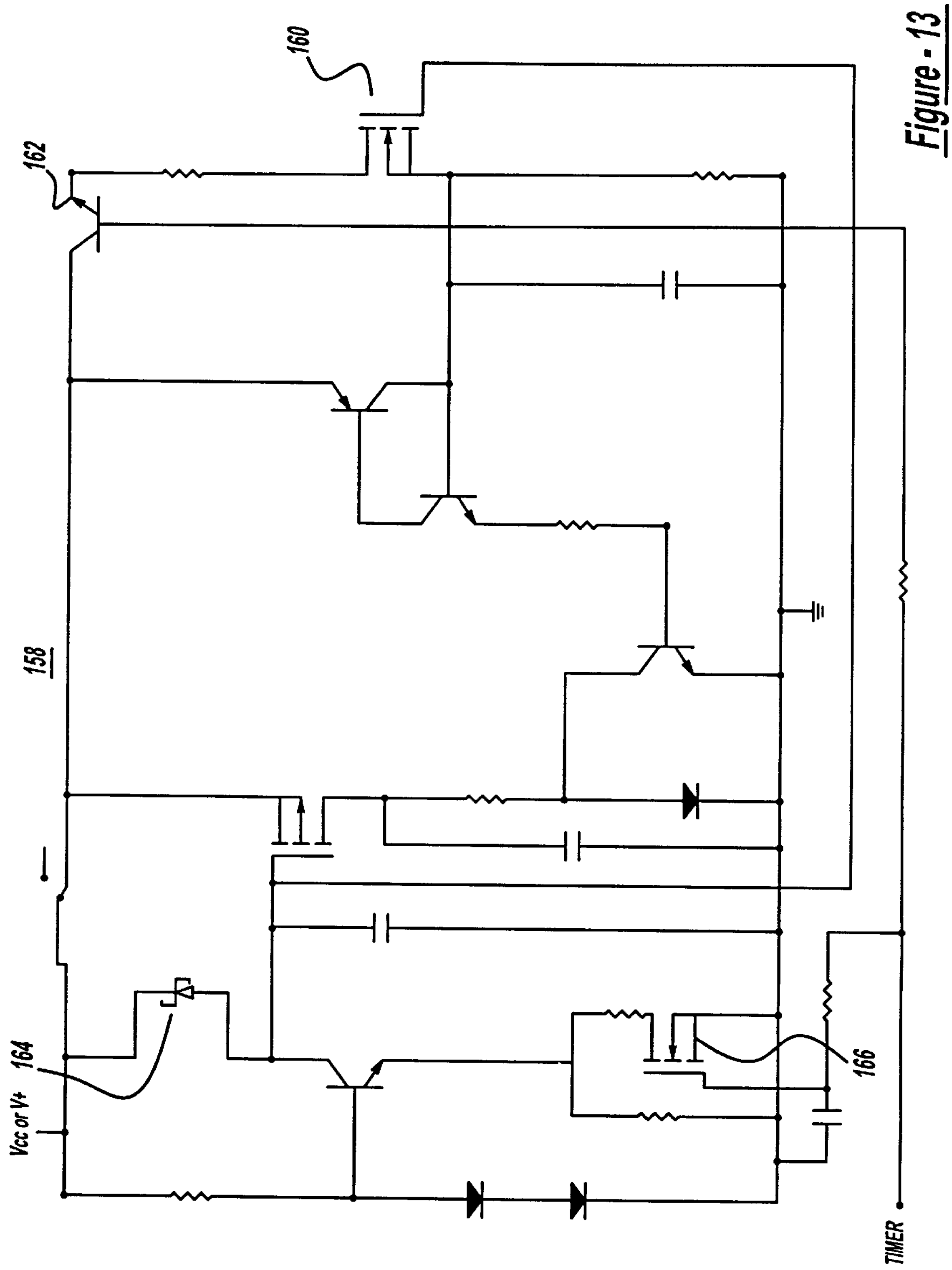
FIG. 13 is a circuit schematic of a temperature control circuit including a latching circuit for locking out temperatures above a cycling temperature.
Figure 14:
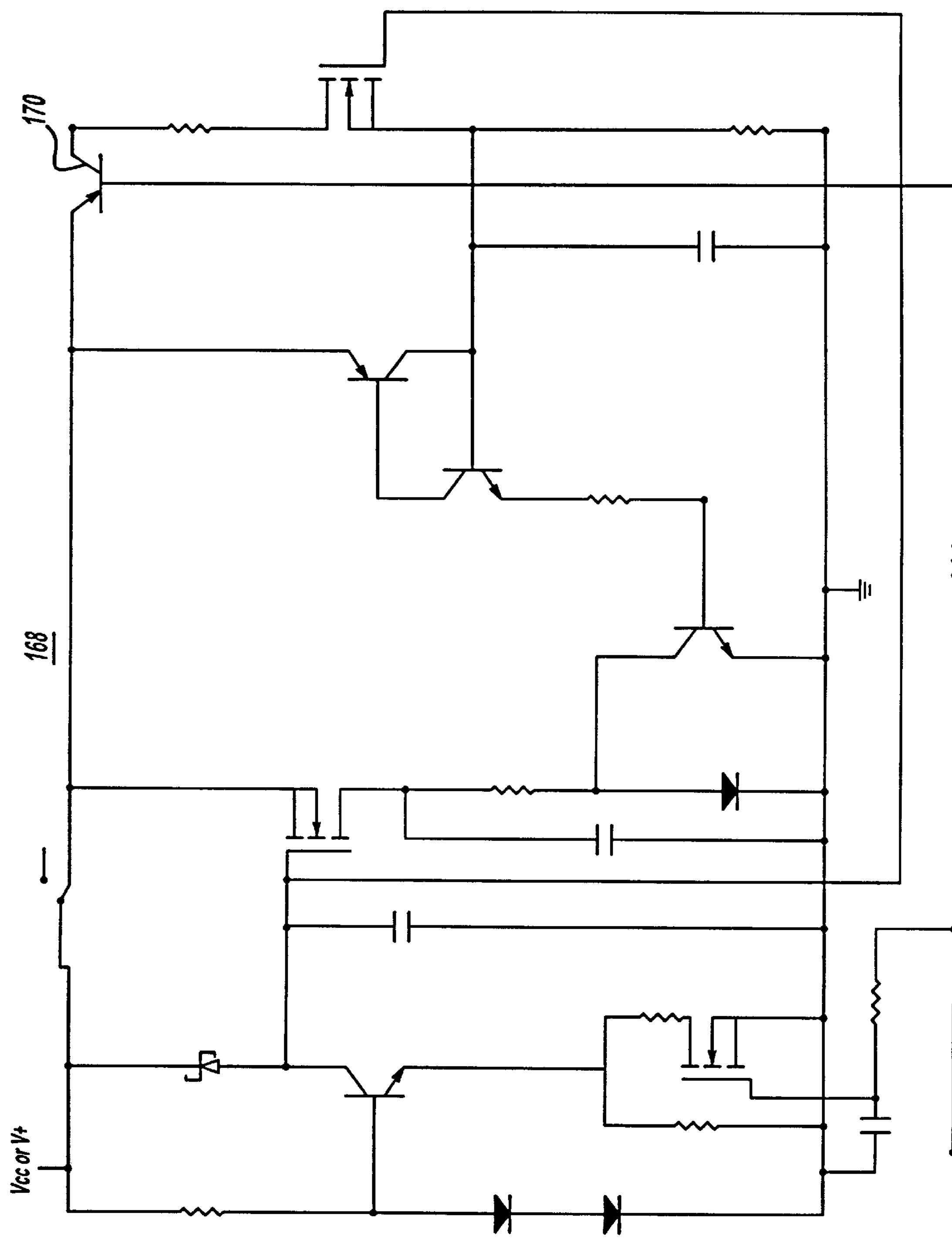
FIG. 14 is a circuit schematic of a temperature control circuit including a latching circuit for locking out temperatures below a cycling temperature.

Turning now to FIG. 13, a temperature control circuit 158 for providing latching with only one sensing diode is shown. It will be appreciated that temperature control circuit 158 is used for locking out temperatures above a cycling temperature. The latch circuit FET 160 can be driven from the same collector circuit as the cycling circuit. The latching circuit is enabled and disabled by a series NPN transistor 162. The sensing diode current is set by either one or two resistors in the sensed diode current path. The second resistor, when enabled, increases the temperature operating point of the sensing diode 164. The second resistor is enabled by an enabling transistor 166 placed in series with that resistance leg. The sensing diode 164 set point and the latching circuit are enabled simultaneously by a square wave. Both increased set point and latching are disabled for normal, cycling operation. The switching frequency is determined by the minimum time needed to require lockout and the maximum time tolerated on the cycling control portion of the circuit. FIG. 14 shows a timing control circuit 168 for locking out temperatures below a given cycling temperature. Thus, if an initial fault condition requires control latching, then the circuit of FIG. 13 can be modified to detect such a condition. If the initial condition is merely a higher temperature, square wave input can be a low to high timed signal. If the initial condition is a lower temperature than the cycling control, the series transistor 170 for the latching circuit is changed to a PNP transistor to use the low to high timed signal.

Figure 15:
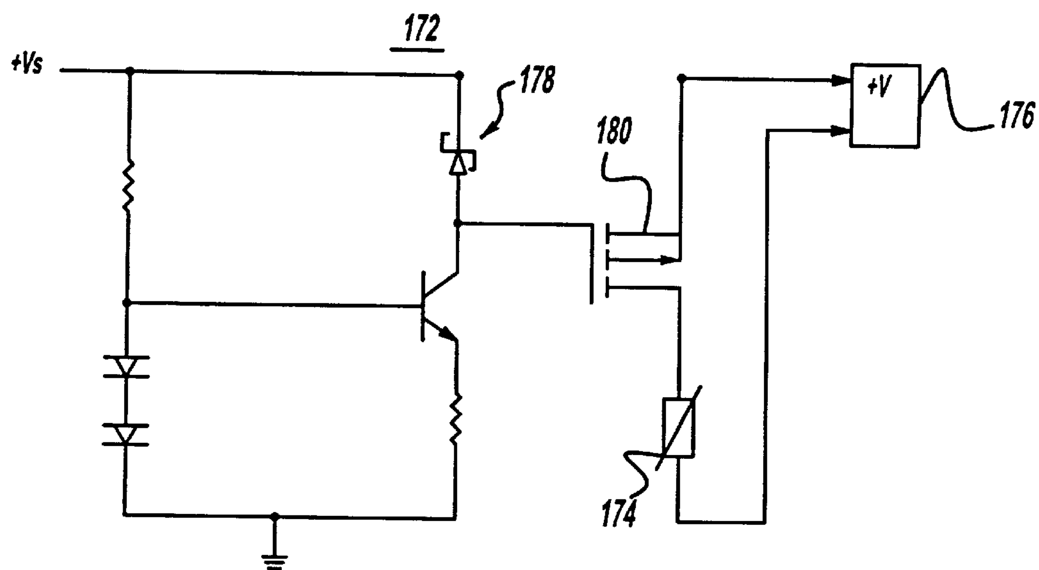
FIG. 15 is a circuit schematic of a relay driver circuit including a switching mechanism coupled to a relay coil circuit.

It will be appreciated that the diode temperature sensor of the present invention can be used for a relay driver circuit as shown in FIG. 15. Relay driver circuit 172 has a relay coil circuit 174 coupled to a power source 176, wherein the power source 176 provides power to a load associated with the relay coil circuit 174. A diode temperature sensor 178 is biased to provide a switching signal at a sensing temperature, and a switching mechanism 180 is coupled to the relay coil circuit 174. It will be appreciated that the switching mechanism 180 is preferably an FET and controls the relay coil circuit 174 in response to the switching signal. The gate of FET 180 is connected to the collector of the diode temperature sensor 178. The FET gate, having a very high impedance, does not change or affect the temperature set point of the sensing diode because no current flows through the FET gate.

The collector of the diode temperature sensor 178 goes from a low state (0.7V) to a high state (5V) when the temperature of the sensing diode goes through the sense point. The transition takes approximately three degrees for the collector of the diode temperature sensor 178 to go from one state to another. This transition is dependent on the rate of temperature change. Once the gate threshold voltage of the relay driver FET 180 is reached, the FET 180 begins conduction. The FET 180 goes through a transition from the beginning of conduction to full conduction, depending on how far above the gate threshold voltage the temperature reaches. As a result, the rate of change through the FET 180 (and through the output relay) is dependent on the rate of change in temperature of the diode temperature sensor 178 is exposed to. When the rate of change is slow, however, the output relay contacts cycle when approaching the pull-in or drop-out point. This phenomenon, commonly teamed "chatter", can reduce the lifetime of the output relay and may tend to cause functionality problems with the output relay.

Figure 16:
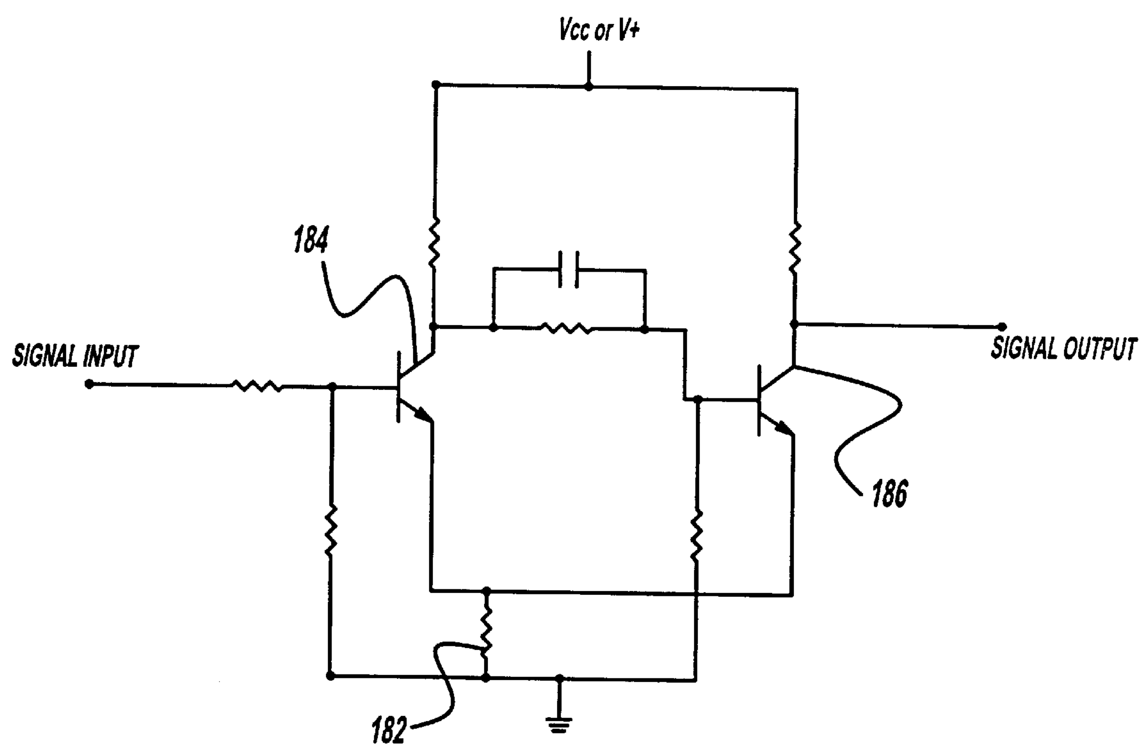
FIG. 16 is a circuit schematic of a traditional NPN Schmitt trigger.
Figure 17:
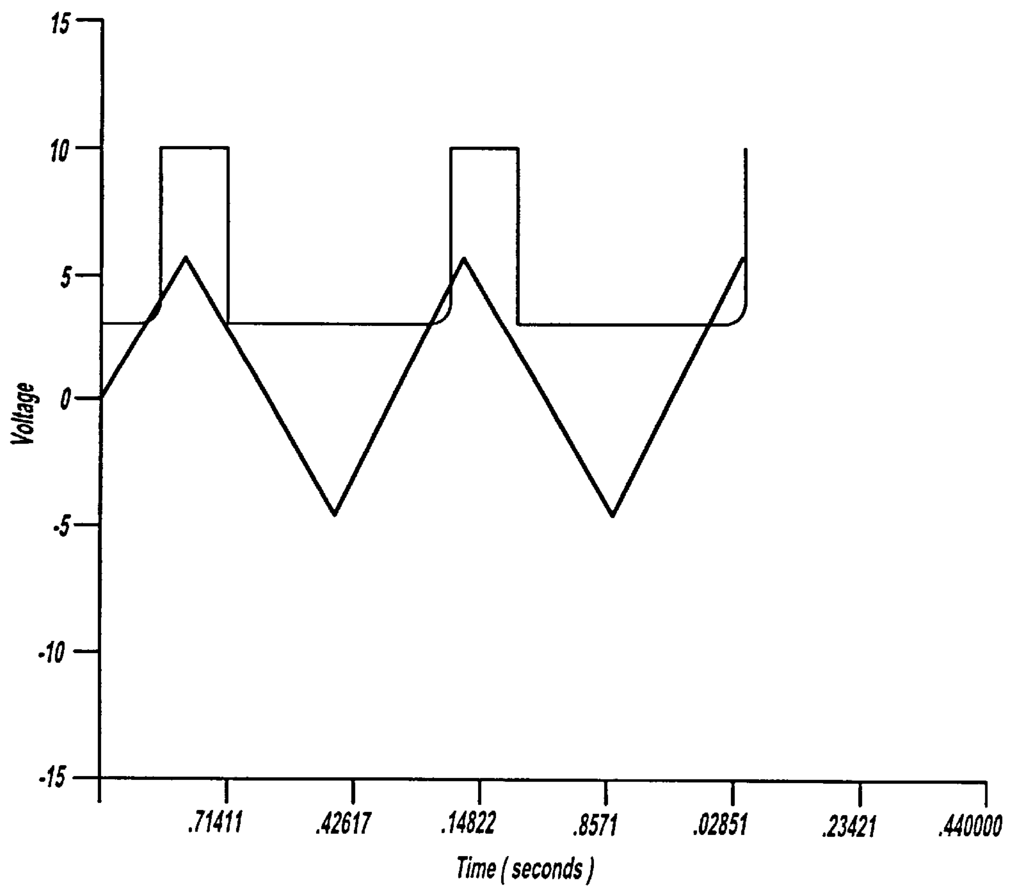
FIG. 17 is a plot of an output trace for the Schmitt trigger of FIG. 16.
Figure 18:
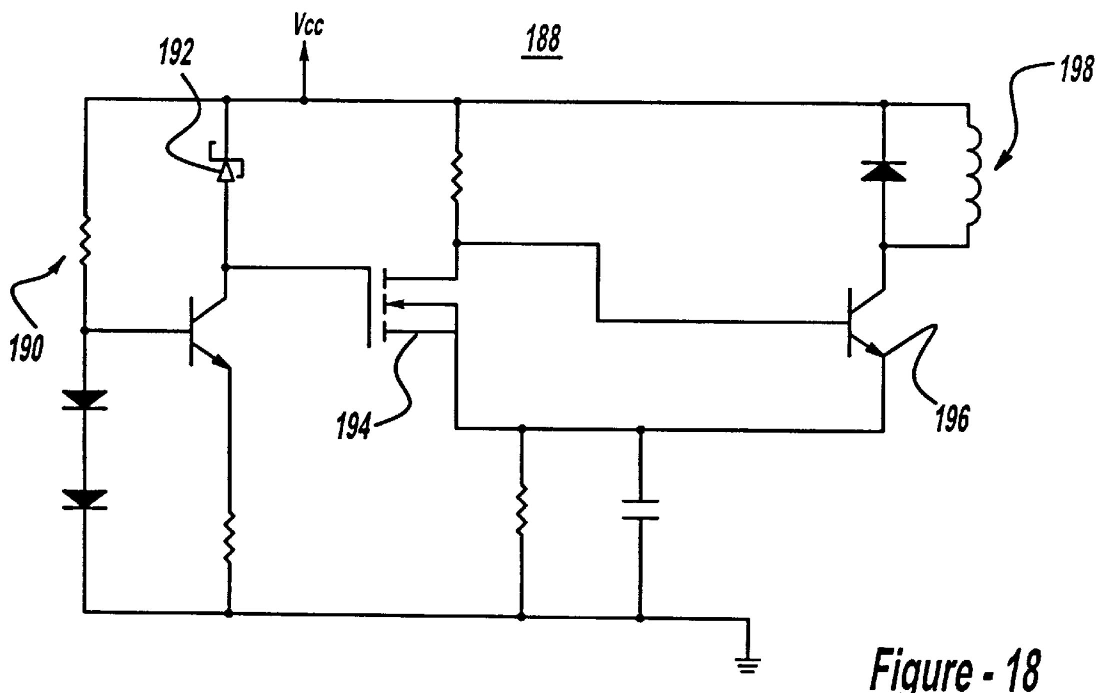
FIG. 18 is a circuit schematic of a relay driver circuit including a relay coil circuit utilizing a modified Schmitt trigger.

FIGS. 16–18 demonstrate that a Schmitt trigger circuit can be used for hard switching action and thereby reduce the likelihood of chatter. The increase in slew rate is the result of a common emitter resistor 182. For instance, when the input is low the first transistor 184 begins conduction, lowering the base drive on the second transistor 186. At the same time, current begins to flow through the emitter resistor 182 through the first transistor 184, and lowering $V_{BE}$ on the second transistor 186. The second transistor 186 adjusts to this condition by decreasing its collector current. This process continues until the first transistor 184 is in full conduction and the second transistor 186 is in cutoff. The transition between states is very rapid in relation to the rate of change in the input signal, resulting in a very defined transition in the output stage. FIG. 17 therefore shows a plot of an output trace for the Schmitt trigger shown in FIG. 16.

Turning now to FIG. 18, a circuit schematic of a relay driver circuit 188 including a relay coil circuit utilizing a modified Schmitt trigger is shown. The collector of the diode temperature sensor 190 goes from a low state to a high state as a result of an increase in temperature of the sensing diode (represented by the collector potentiometer 192). This transition occurs within a three degree span and is dependent upon the rate of temperature change. The second part of the circuit 188 (N-MOSFET and NPN transistor) is a modified Schmitt trigger. The second transistor, is the input stage for the Schmitt trigger. A N-MOSFET 194 has been substituted for the NPN transistor to provide a high impedance to the diode temperature sensor. The third transistor 196 drives a relay 198. The common resistor for the Schmitt trigger stage is sized to provide enough current through the output stage to pull in the relay when the third transistor 196 is in conduction, yet is still a high enough value to provide sufficient feedback in the Schmitt trigger stage to provide rapid switching action. The N-MOSFET drain resistor is sized to limit the base current to the output stage. Modeling circuit 188 on a SPICE simulator resulted in the output stage providing 153 mA in conduction and 0.000 $\mu$A in cutoff. Switching action centered around 2.65V on the collector of the diode temperature sensor with switch points approximately +/−3.5 from the center and a hysteresis of approximately 0.5V. Switching action is therefore very precise. A one $\mu$F bypass capacitor can be added between the common node of the Schmitt trigger stage and ground to suppress low level oscillations that the model predicted in the circuit 188. The circuit 188 may be redesigned for reverse operation using a P-MOSFET or a normally open relay. The circuit may also be redesigned for a different relay by providing a separate voltage source for the trigger circuit/relay driver and re-optimizing the resistor values in the circuit.

Figure 21:
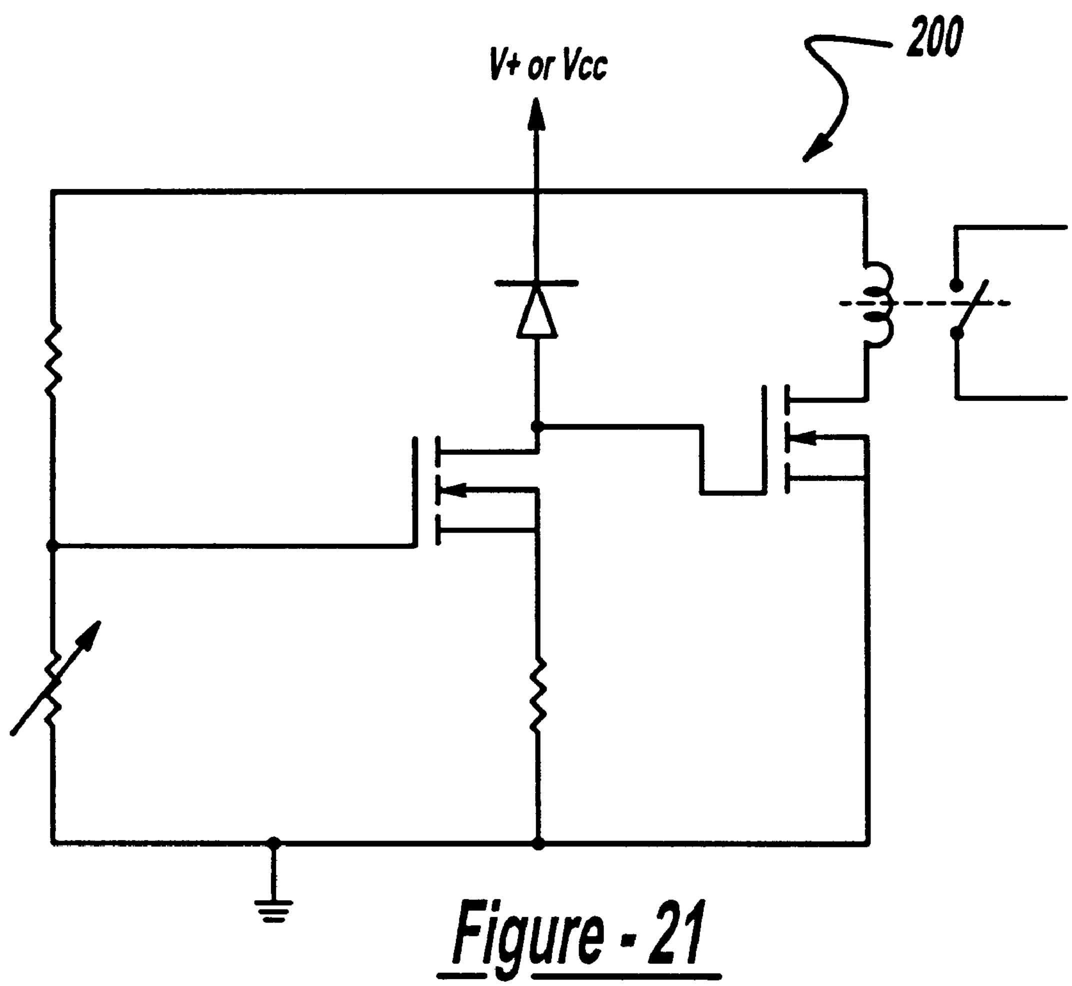
FIG. 21 is a circuit schematic of a voltage-controlled Schottky Diode Temperature Sensor (SDTS).

As already discussed, FIG. 19 shows a mechanical solution to dry start protection via a float and reed switch 202. FIG. 20 is a PCB layout for the temperature control circuit of FIG. 19. FIG. 21 demonstrates an alternative voltage-controlled SDTS design at 200.

Having described in detail the preferred embodiments of the present invention, including its preferred modes of operation, it is to be understood that this operation could be carried out with different elements and steps. This preferred embodiment is presented only by way of example and is not meant to limit the scope of the present invention which is defined by the following claims.

What is claimed:

1. A temperature control circuit for removing power from a load at a first temperature, comprising:

a first optical isolation device selectively connecting a power source to the load, the power source providing power to the load;

a first diode temperature sensor having a first reverse-biased Schottky diode and a first adjustable constant current source coupled to the first diode for applying an adjustable reverse leakage current to the first diode, wherein a voltage drop across the first reverse-biased diode corresponds to a sensed temperature, the sensor biased to provide a switching signal at the first temperature; and a first switching mechanism disposed between the first diode temperature sensor and the first optical isolation device, the first switching mechanism disengaging operation of the first optical isolation device in response to the switching signal.

2. The temperature control circuit of claim 1 wherein the first switching mechanism is shunted across the first optical isolation device.

3. The temperature control circuit of claim 1 wherein the first switching mechanism is connected in series with the first optical isolation device.

4. The temperature control circuit of claim 1 wherein the first optical isolation device is a photo-triac driver.

5. The temperature control circuit of claim 1 further including a high limit cycling circuit for disengaging operation of the power source at a second temperature.

6. The temperature control circuit of claim 5 wherein the high limit cycling circuit includes:

a second diode temperature sensor having a second reverse-biased Schottky diode and a second adjustable constant current source coupled to the second diode for applying an adjustable reverse leakage current to the second diode, wherein a voltage drop across the second reverse-biased diode corresponds to a sensed temperature, the sensor biased to provide a switching signal at the second temperature; and a second switching mechanism coupled to the first optical isolation device, the second switching mechanism disengaging operation of the first optical isolation device in response to the switching signal.

7. The temperature control circuit of claim 5 wherein the high limit cycling circuit includes:

a second optical isolation device controlling operation of the power source, the second optical isolation device connected in series with the first optical isolation device;

a second diode temperature sensor having a second reverse-biased Schottky diode and a second adjustable constant current source coupled to the second diode for applying an adjustable reverse leakage current to the second diode, wherein a voltage drop across the second reverse-biased diode corresponds to a sensed temperature, the sensor biased to provide a switching signal at the second temperature; and a second switching mechanism coupled to the second optical isolation device, the second switching mechanism disengaging operation of the second optical isolation device in response to the switching signal.

8. The temperature control circuit of claim 1 further including a latching circuit disposed between the first switching mechanism and a second optical isolation device, the latching circuit maintaining the temperature control circuit in a switched state until a manual reset occurs.

9. The temperature control circuit of claim 8 wherein the latching circuit includes:

a silicon controlled rectifier shunted across the second optical isolation device; and a manual reset switch connected in series with the second optical isolation device.

10. The temperature control circuit of claim 8 wherein the latching circuit includes:

a bipolar transistor shunted across the second optical isolation device;

a silicon controlled rectifier connected in series with the bipolar transistor; and a manual reset switch connected in series with the second optical isolation device.

11. The temperature control circuit of claim 1 further including a latching circuit disposed between the first switching mechanism and the first optical isolation device, the latching circuit maintaining the temperature control circuit in a switched state until a manual reset occurs.

12. The temperature control circuit of claim 1 wherein the latching circuit includes:

a silicon controlled rectifier shunted across the first optical isolation device; and a manual reset switch connected in series with the first optical isolation device.

13. The temperature control circuit of claim 1 wherein the latching circuit includes:

a bipolar transistor shunted across the first optical isolation device;

a silicon controlled rectifier connected in series with the bipolar transistor; and a manual reset switch connected in series with the first optical isolation device.

14. The temperature control circuit of claim 1 further including a level-based protection circuit for disengaging the power source at a predetermined fluid level.

15. The temperature control circuit of claim 14 wherein the protection circuit includes a reed switch.

16. A temperature control circuit for removing power from a load at a first temperature, comprising:

a first optical isolation device selectively connecting a power source to the load, the power source providing power to the load;

a first diode temperature sensor having a first reverse-biased diode and a first adjustable constant voltage source for applying an adjustable reverse voltage to the first diode; wherein a reverse current through the first reverse-biased diode corresponds to a sensed temperature, the sensor biased to provide a switching signal at the first temperature; and a first switching mechanism disposed between the first diode temperature sensor and the first optical isolation device, the first switching mechanism disengaging operation of the first optical isolation device in response to the switching signal.

17. The temperature control circuit of claim 16 further including a high limit cycling circuit for disengaging operation of the power source at a second temperature.

18. A relay driver circuit comprising:

a relay coil circuit coupled to a power source, the power source providing power to a load;

a diode temperature sensor having a reverse-biased Schottky diode and an adjustable constant current source coupled to the reverse-biased diode for applying an adjustable reverse leakage current to the reverse-biased diode, wherein a voltage drop across the reverse-biased diode corresponds to a sensed temperature, the sensor biased to provide a switching signal at a sensing temperature; and a switching mechanism coupled to the relay coil circuit, the switching mechanism controlling the relay coil circuit in response to the switching signal.

19. The relay driver circuit of claim 18 wherein the switching mechanism is a field effect transistor.

20. The relay driver circuit of claim 18 wherein the relay coil circuit includes a Schmitt trigger circuit for eliminating chatter.

21. A method for removing power from a load at a first temperature, the method comprising the steps of:

selectively connecting a power source to the load with a first optical isolation device;

coupling an adjustable constant current source to a reverse biased Schottky diode such that a first diode temperature sensor is biased to provide a switching signal at the first temperature, the adjustable constant current source applying an adjustable leakage current to the diode, wherein a voltage drop across the reverse-biased diode corresponds to a sensed temperature; and disengaging operation of the first optical isolation device in response to the switching signal.

22. The method of claim 21 further including the step of disengaging operation of the power source at a second temperature.

* * * * *